3,447,643
REVERSIBLE ONE-WAY BRAKE
Otmar M. Ulbing, Berkshire, N.Y., assignor to Ingersoll-Rand Company, New York, N.Y., a corporation of New Jersey
Filed Nov. 21, 1967, Ser. No. 684,780
Int. Cl. F16d 63/00, 11/06; G05g 5/06
U.S. Cl. 188—82.2          10 Claims

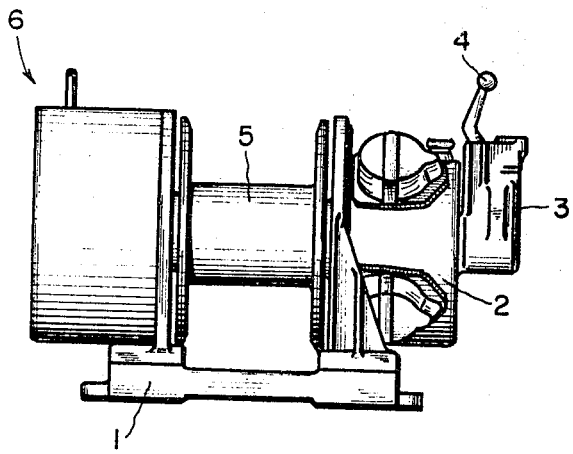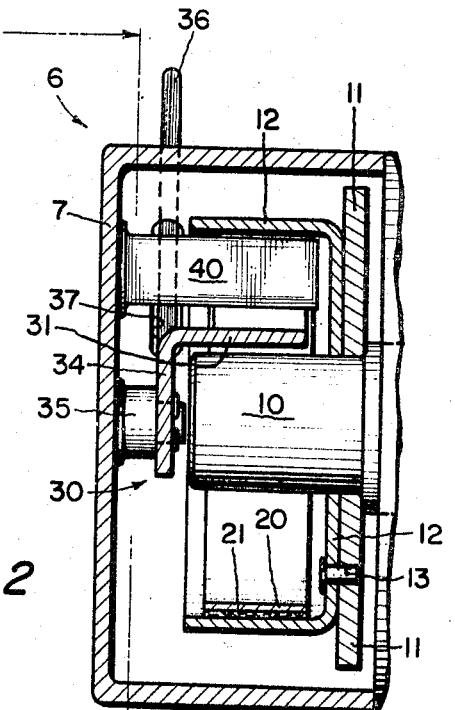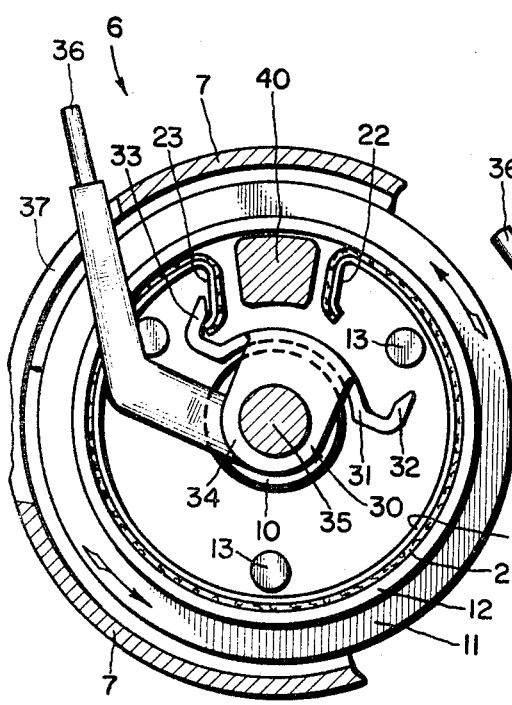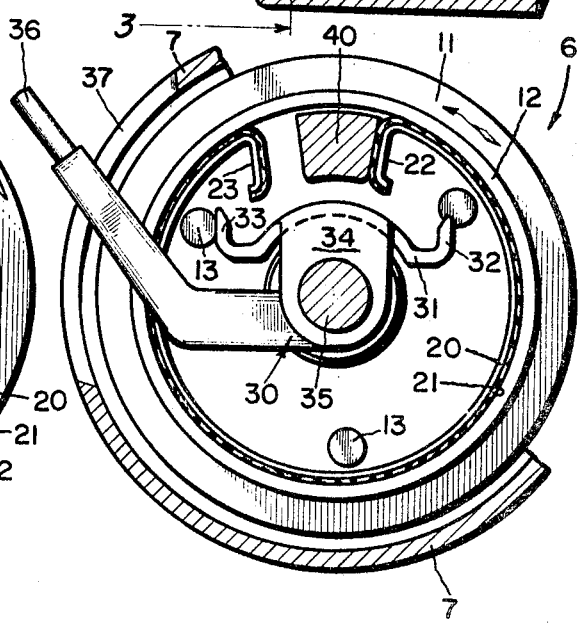
FIG. 1
FIG. 2
FIG. 3
FIG. 4
INVENTOR
OTMAR M. ULBING
Frank H Thomson
ATTORNEY United States Patent Office 3,447,643
Patented June 3, 1969

ABSTRACT OF THE DISCLOSURE

A self-energizing brake including a brake drum and a brake band mounted within the brake drum. The band has a free diameter larger than the inside diameter of the drum so that it normally engages the brake drum to prevent rotation. The brake band has opposite free ends, one of which is moved away from the brake drum to allow the drum to rotate in one direction only. The brake band continues to provide braking action in the other direction of rotation. Alternatively, the other free end of the band may be pulled away from the brake drum to allow the drum to rotate in the opposite direction. A reaction post permits the single brake band to self-energize regardless of the direction of rotation of the brake drum.

Background of the Invention

This invention relates to brakes and more specifically to a self-energizing brake which is particularly well adapted for use with a hoist.

Self-energizing brakes are well known. Prior self-energizing brakes provide a pair of brake shoes and a reaction or pivot point for each brake shoe in order to achieve a brake which is self-energizing in both directions of rotation. Thus, in order to provide self-energizing action in both directions, a complex arrangement must be provided. In many applications such as hoists, it is desirable to have a brake which is normally in braking position so that some actuating force is necessary to release the brake. Brakes which accomplish this purpose are known but they have the disadvantage that they allow the brake drum to rotate in either direction when they are released. In a hoist, this can be dangerous. If a load is being raised and the motor for some reason shuts off, the load can drop before the brake is applied. With the present invention, when the brake is released, the brake drum can rotate in one direction only.

Summary

It is therefore the principal object of this invention to provide a simple brake which is self-energizing in both directions.

It is another object of this invention to provide a brake which, when released, allows rotation in one direction only.

It is a further object of this invention to provide a novel brake which is automatically applied if pressure is released on the brake releasing means.

In general, these objects are carried out by providing a brake having a rotatable brake drum, a brake drum band mounted for normal engagement with the brake drum to prevent the brake drum from rotating in either direction and having opposite free ends. There is release means for selectively moving one of the free ends away from the drum to permit the brake drum to rotate in one direction while the brake band prevents the drum from rotating in the other direction.

Brief description of the drawing

The foregoing and other objects will become apparent from the following description and drawings wherein:

FIG. 1 is an elevation of a hoist employing one embodiment of this invention;

FIG. 2 is a sectional view showing the braking apparatus;

FIG. 3 is a sectional view taken on the lines 3—3 of FIG. 2 showing the braking apparatus in brake release position permitting rotation of the brake drum in one direction only; and FIG. 4 is a view similar to FIG. 3 showing the apparatus in brake applied position.

Description of the preferred embodiment

Referring to FIG. 1 there is shown a hoist of a well known type. This hoist includes a support base 1, suitable motor means 2, a transmission 3 and operating handle 4. The motor 2 rotates a hoist drum 5 through a suitable drive shaft. A cable may be wound around the drum 5 to act with the drum 5 as a means for raising and lowering a load. The braking apparatus of this invention is generally indicated at 6 and shown in detail in FIGS. 2, 3 and 4. Although a particular type of hoist has been shown, it is not intended that the brake of this invention be limited by its application to any machine or particular type of hoist.

The braking apparatus is provided with a housing 7. A shaft 10, which may be an extension of the hoist drum 5 or the motor drive shaft, extends into the housing 7 for rotation with the hoist drum 5. A plate 11 is secured to the shaft 10 for rotation therewith. A brake drum 12 is secured by means of rivets 13 to the plate 11 and thus will rotate with the hoist drum 5. The brake drum 12 may be a stamping and, if desired, can be secured directly to the shaft 10 or the hoist drum 5.

A brake band 20, preferably made of spring steel, is mounted within the brake drum 12 and has one side covered with a friction material 21. The brake band is dimensioned so that it has free a diameter larger than the inside diameter of the brake drum 12 and thus is normally biased by the resiliency of the band 20 into engagement with the internal surface of the brake drum 12. The brake band 20 is provided with free ends 22 and 23 positioned on opposite sides of a reaction post 40.

A release mechanism is generally indicated at 30 and includes an arm 31 having hooked or curved fingers 32 and 33. The arm has an angular portion 34 which is rotatably secured to the housing 7 by means of a post 35 so that the release mechanism 30 can rotate about its own axis relative to the brake drum. A brake actuating handle 36 is connected to the angular member 34 and extends out of the housing 7 through a slot 37.

With the brake in its normal brake applied position, if the motor 2 tries to rotate the brake drum in either direction, a self-energizing effect will take place to prevent rotation. Referring to FIG. 4, if it is attempted to rotate the brake drum 12 in a counterclockwise direction as shown by the arrow, the biasing of the brake band 20 into the drum 12 will cause the brake band to rotate with the brake drum until the free end 22 engages the fixed reaction post 40. The reaction post 40 prevents further movement of the brake band 20 with the drum 12. Continued effort to rotate the drum will cause the brake band to pivot about a point located at the reaction post 40 forcing the free end 23 to move into tighter engagement with the internal surface of the brake drum and thereby increase the braking force. A self-energizing effect is clearly provided. If the drum is rotated in the clockwise direction, the brake band 20 will rotate with the drum 12 so that the free end 22 will move away from the reaction post 40. The free end 23 will contact the other side of the reaction post 40 and the self-energizing effect will take place in the opposite direction. The reaction post 40 provides the pivot point for the brake band in both directions of rotation and self-energizing action is provided in both directions with a single brake band.

To release the brake and allow the brake drum to rotate in one direction, the handle 36 is moved so that the release mechanism is rotated about its own axis relative to the brake durm in a direction opposite to the direction of desired rotation of the brake drum. One of the hooks or curved fingers 32 or 33 will engage one of the free ends 22 or 23. The free end engaged will be pulled away from the brake drum. Referring to FIG. 3, if it is desired to allow the brake drum to rotate in the counterclockwise direction, the handle 36 is grasped and raised so that the releasing means is rotated in a clockwise direction. This allows the curved finger 33 to engage the free end 23 and pull that portion of the brake band away from the internal surface of the brake drum. With the releasing means and brake band held in this position, when the brake drum is rotated in the counterclockwise direction, the brake band will not rotate with the brake drum because it is held in place by the finger 33 holding free end 23. The free end 22 cannot engage reaction post 40 so there is no point about which the brake band can pivot and self-energizing action cannot take place. The resiliency of the brake band 20 is not sufficiently strong to brake the drum 12 without the self-energizing force so that the brake drum may rotate in the counterclockwise direction.

If the brake drum 12 starts to rotate in the clockwise direction, the band 20 will rotate with it since there is nothing keeping the band from rotating in that direction. The free end 23 will pull free from the finger 33 and engage the reaction post 40 to provide a pivot point. Self-energizing action in the clockwise direction is then provided. Thus, the brake drum can rotate in only one direction when the brake is released.

If it is desired to have the brake drum rotate in the clockwise direction, the handle and releasing means are rotated in the counterclockwise direction so that the curved finger 32 engages the free end 22 pulling the free end 22 away from the internal surface of the brake drum.

When the handle 36 is released the spring action of the brake band will cause the free end to move into engagement with the internal surface of the brake drum and permit the brake to be applied as previously stated.

There will be some wear of the brake while the brake drum is rotating in the released direction. In the position shown in FIG. 3 where the hoist is rotating in the counterclockwise direction, some wear will occur at the free end 22. This wear will not, however, severly shorten the life of the band or deter the braking action to any great extent. The free ends act mainly as the pivot point and the braking action is provided mostly by the self-energizing action.

The advantages of this brake as applied to hoists is readily apparent. This brake is extremely economical to manufacture. The parts are simple and few of them move. If a load is being raised and the motor is shut off due to power failure or the like, the load will not be lowered because the brake drum and thus the hoist drum 5 cannot rotate in the lowering direction. This is because even if the brake is in the release position the brake drum and hoist can rotate in only one direction. If it is desired to hold a load at any position, it is merely necessary to let go of the actuating arm 36 and the brake is automatically applied. If desired, the brake could be connected to the motor actuating lever 4 thereby permitting the brake to be applied as the motor is stopped and released as the motor is started.

I claim:
1. A brake comprising:
   a rotatable brake drum;
   a brake band mounted for normal frictional engagement with said brake drum for preventing said drum from rotating in either direction and having opposite free ends; and
   release means operable independently of the rotation of said brake drum for selectively moving one of said free ends away from said broke drum to permit said drum to rotate in one direction while said brake band prevents said brake drum from rotating in the other direction.

2. The brake of claim 1 wherein said brake band is mounted within said brake drum for normal frictional engagement with the internal surface of said brake drum.

3. The brake of claim 2 wherein said brake band is circular in configuration and extends substantially around the entire internal circumference of said brake drum and has a free diameter larger than the inside diameter of said brake drum.

4. The brake of claim 3 wherein said release means includes an arm mounted within said brake drum for rotation about its own axis relative to said brake drum, said arm being rotatable in one direction for moving one of said free ends away from said internal surface and rotatable in the other direction for moving the other free end away from said internal surface.

5. The brake of claim 4 further comprising means positioned between the free ends of said brake band providing a point about which said brake band can react to provide a self-energizing force in either direction.

6. The brake of claim 5 wherein said arm has a curved finger on each end, each adapted to selectively engage one of said free ends.

7. For use in combination with a hoist having a motor, a shaft mounted for rotation by said motor and means operable by said shaft for raising and lowering a load, a brake comprising:
   a brake drum mounted for rotation with a shaft;
   a brake band mounted for normal frictional engagement with said brake drum and having opposite free ends;
   means positioned between said free ends adapted to be selectively contacted by either free end to provide a reaction point for said brake band so that said brake is self-energizing in two directions; and
   release means operable independently of the rotation of said brake drum for selectively preventing one of said free ends from contacting said reaction point providing means to permit said brake drum to rotate in one driection.

8. The combination set forth in claim 7 wherein said brake band is circular in configuration and mounted within said brake drum for normal engagement with the internal surface of said brake drum and having a free diameter larger than the inside diameter of said brake drum.

9. The combination of claim 8 wherein said release means includes an arm mounted within said brake drum for rotation about its own axis relative to said brake drum; said arm being rotatable in one direction to permit rotation of said drum in one direction and rotatable in the other direction to permit rotation of said drum in the other direction.

10. The combination of claim 3 wherein said arm has means on each end adapted to selectively engage and pull one of said free ends away from the internal surface of said drum.

References Cited

UNITED STATES PATENTS

| 2,784,810 | 3/1957 | Ulmann | 188—82.6 X |
| 2,961,217 | 11/1960 | Sacchini | 188—82.6 X |
| 3,110,380 | 11/1963 | Meyer et al. | 74—531 X |

FOREIGN PATENTS

| 46,389 | 2/1911 | Austria. |

GEORGE E. A. HALVOSA, Primary Examiner.

U.S. Cl. X.R.

74—531; 188—82.6; 192—43, 47